United States Patent Office 3,456,188
Patented July 15, 1969

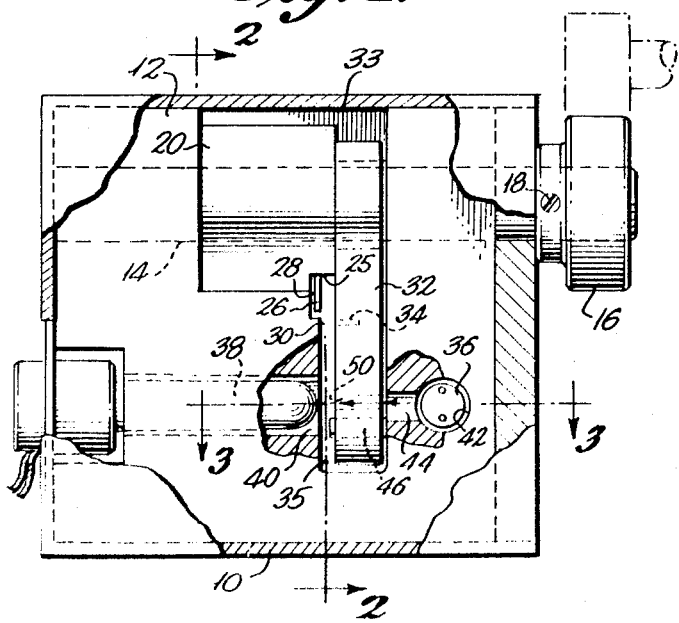
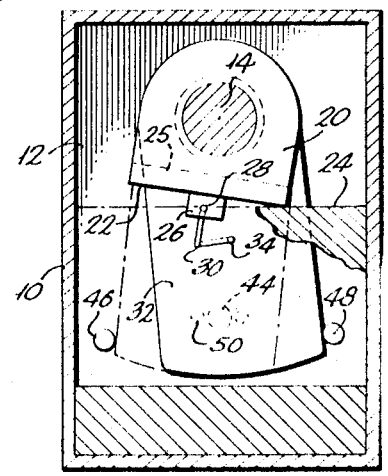
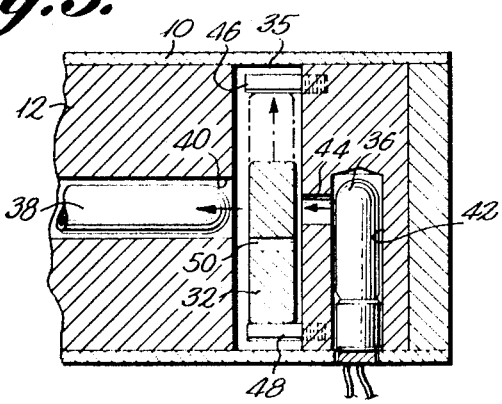
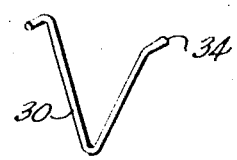
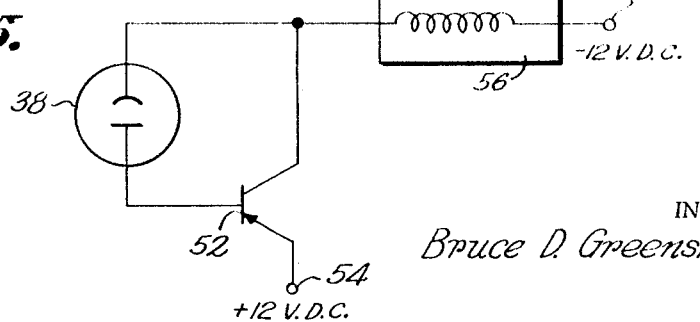
INVENTOR
Bruce D. Greenshields

3,456,188
APPARATUS FOR MEASURING SHAFT REVERSAL FREQUENCY AND PULSE GENERATOR USED THEREIN
Bruce D. Greenshields, 1025 Arbordale St., Ann Arbor, Mich. 48103
Filed Oct. 19, 1965, Ser. No. 497,741
Int. Cl. G01r 23/02, 23/06
U.S. Cl. 324—78                                                7 Claims

ABSTRACT OF THE DISCLOSURE

This specification discloses a driver training apparatus for measuring the frequency of steering wheel reversals. A pulse generator produces a constant impulse content pulse each time the steering wheel reverses. The frequency of these pulses are measured by a graphic recorder. In the pulse generator, an input shaft driven by the steering wheel frictionally drives a mechanical actuator between two mechanical stops. The mechanical actuator is connected to a shutter by means of a spring in such a manner that the shutter will be actuated each time the actuator is rotated to the opposite stop. The shutter produces a light pulse which is converted to an electrical pulse by a photocell.

---

This invention relates to pulse generators and measuring apparatus employing pulse generators and more particularly to an apparatus for providing an indication of the number of reversals per unit time of an input shaft and a constant impulse content pulse generator used in such apparatus.

In the copending application Ser. No. 329,037, filed Dec. 9, 1963, entitled "Driver Training Apparatus," there is disclosed a testing device in which the number of steering wheel reversals per unit time, or in other words the frequency of steering wheel reversals, are measured. The present invention provides an improved apparatus for making this measurement. In accordance with the present invention there is a unique pulse generating device, which produces a pulse each time the input shaft reverses direction. The pulses produced by the pulse generator are fed to a graphic recorder, which due to its natural inertia, provides an output indication proportional to the frequency of the applied pulses. The recorder will thus provide an indication of the frequency of the input shaft reversals. Thus, by coupling the input shaft to the steering wheel the frequency of steering wheel reversals can be measured.

In order for the recorder to provide an accurate indication, the pulses produced by the pulse generator must be of a constant impulse content. The pulse generator of the present invention comprises a simple but unique mechanical mechanism operating in conjunction with a photocell to produce the constant impulse content pulses.

In the pulse generator the input shaft frictionally drives a mechanical actuator between two mechanical stops. The mechanical actuator is connected to a shutter by means of a spring. The shutter is rotatably mounted on the input shaft so that it can pivot between two stops. Each time the input shaft reverses direction it will cause the mechanical actuator to be rotated to the opposite stop. When the mechanical actuator gets past a center position relative to the shutter, the spring connection between the actuator and the shutter will drive the shutter to the opposite stop. The shutter rotates in a path between a light source and a photocell and is provided with an aperture which will pass through this path when the shutter is rotated between its two stops. Accordingly, a pulse of light will pass from the light source to the photocell each time the shutter is rotated from one stop to the other. Because the shutter is driven by the force of the spring, which is constant, its speed of rotation between the stops is always the same and as a result the resulting pulse of light applied to the photocell will be of constant duration. Accordingly, the photocell can be used to control the production of an output pulse which will be produced each time the input shaft reverses direction and which will be of the same impulse content for each input shaft reversal.

Accordingly, an object of the present invention is to provide improved apparatus for measuring the frequency reversals of an input shaft.

Another object of the present invention to to provide an improved pulse generator for generating pulses of constant impulse content.

A further object of the present invention is to provide an apparatus which will generate light pulses of a constant duration.

A still further object of the present invention is to provide a mechanically actuated device for producing pulses of constant impulse content.

Further objects and advantages of the present invention will become readily apparent as the following detailed description of the invention unfolds and when taken in conjunction with the drawings wherein:

FIG. 1 is a elevation, partially in section, showing the pulse generator of this invention;

FIG. 2 is a sectional view taken along line 2—2 of FIG. 1;

FIG. 3 is a sectional view taken along line 3—3 of FIG. 1;

FIG. 4 is a perspective view of the spring used in the pulse generator; and

FIG. 5 is a circuit diagram of the measuring device of the present invention.

As shown in FIGS. 1–3, the switching device of this invention includes a housing 10 enclosing a block 12 having cavities defined therein. A shaft 14 is rotatably mounted in the block 12 and extends out from the housing 10 a distance sufficient to receive a drive wheel 16, which is fixed to one end of the shaft 14. A set screw 18 is used to firmly fasten the drive wheel 16 to the shaft 14. A D-shaped actuator 20 is rotatably mounted with an adjustable friction fit on the shaft 14 within a cavity in the block 12. The actuator 20 has a flat surface 22 adapted to contact a horizontal shoulder 24 of the block 12 and can turn in either direction with the shaft 14 through a small angle between the mechanical stops provided by the shoulder 24. The underside of the actuator 20 is formed with a shoulder 25, from which a small arm 26 extends. The arm 26 has a centrally located aperture 28, in which one end of a wire spring 30 is held. An arm 32 is rotatably mounted at one end of the shaft 14 and comprises the shutter of the mechanism. The actuator 20 and the arm 32 are both situated in an L-shaped cavity 33 in the block 12 defined in part by the shoulder 24. The arm 32 extends down past the shoulder 24 into the leg 35 of the L-shaped cavity. The other end of the wire spring 30 is held in an aperture 34 in the arm 32. The wire spring 30 as best shown in FIG. 4 is in the form of a V and its two ends which are held in the apertures 28 and 34 extend away from the plane of the V in the opposite directions. The V of the spring functions as a bow tending to bias the two ends of the bow apart. A light source 36 is mounted on one side of the leg of the L-shaped cavity 33 and a photocell 38 is mounted on the other side of the leg of the L-shaped cavity. The photocell is positioned in an opening 40 in the block 12 which communicates with the leg 35 of the L-shaped cavity. The light source 36 is positioned in a cavity 42 in the block 12 which cavity communicates with the leg 35 of the L-shaped cavity through a narrow aperture 44. The aperture 44 is positioned directly opposite the photocell 38 so that light would pass from the source 36 to the photocell 38 if it were not block by the arm 32. The lower end of the arm 32 is positioned between the aperture 44 and the photocell 38 so that light from the source 36 is normally blocked from irradiating the photocell 38.

The arm 32 is rotatable between two stops 46 and 48 fixed in the block 12. When the actuator 20 is rotated clockwise to engage the shoulder 24 as illustrated in FIG. 2 the spring 30 will force the arm 32 against the stop 48 and when the actuator 20 is rotated in a counterclockwise direction to engage the shoulder 24, the spring 30 will force the arm 32 to engage the stop 46.

An aperture 50 is defined through the lower end of the arm 32 at the same level as the aperture 44 and the photocell 38 so that when the arm 32 is in a position half way between the stops 46 and 48 light will pass from the source 36 through the aperture 50 to the photocell 38. The arm 32 is of a width such that at all other times light from the source 36 will be blocked from irradiating the photocell 38.

When the drive wheel 16 has been rotating the shaft 14 in a clockwise direction, the actuator 20 will have been rotated in a clockwise direction and will be positioned against the shoulder 24, as shown in FIG. 2, and the arm 32 will be held against the stop 48 by the spring 30. Continued rotation of the shaft 14 after the actuator engages the shoulder 15 is permitted by the friction drive between the shaft 14 and the actuator 20. When the shaft 14 reverses to rotate in a counterclockwise direction, the frictional drive between the shaft 14 and the actuator 20 will drive the actuator 20 in a counterclockwise direction until it again engages the shoulder 24. As the actuator 20 rotates in a counterclockwise direction, it will compress the V shaped bow in the spring 30 until the angular position of the aperture 28 about the shaft 14 passes by the angular position of the aperture 34. When the actuator 20 has rotated to this point, the spring force applied to the arm 32 will no longer urge it in a counterclockwise direction but will urge it in a clockwise direction. Accordingly the arm 32 will be driven by the spring in a clockwise direction against the stop 46. The mechanism will then remain in the condition in which the actuator 20 has been rotated in a counterclockwise direction to engage the shoulder 24 and the arm 32 is held against the stop 46 until the shaft 14 again reverses to rotate in a clockwise direction. Upon this occurrence the shaft 14 will drive the actuator 20 in a clockwise direction until the actuator 20 again engages the shoulder 24. As the actuator 20 is being rotated in a clockwise direction in this manner the angular position of the aperture 28 will again move to the other side of the angular position of the aperture 34 so that the spring force on the arm 32 will be again reversed and the spring 30 will drive the arm 32 from the stop 46 to the stop 48. Thus, each time the shaft 14 changes its direction of rotation from clockwise to counterclockwise the spring 30 will drive the arm 32 from the stop 48 to the stop 46 and each time the shaft 14 changes its direction of rotation from counterclockwise to clockwise the spring 30 will drive the arm 32 from the stop 46 to the stop 48. Each time the arm 32 is moved from the stop 46 to the stop 48 or vice versa, the aperture 50 will pass between the light source 36 and the photocell 38 and the photocell 38 will be irradiated with a pulse of light. Because the arm 32 is driven by the spring 30 whenever it is moved between the stops 46 and 48 the aperture 50 will always move through the path between the light source 36 and the photocell 38 at the same speed. Accordingly, the light pulse which irradiates the photocell 38 will always be of a constant duration. Thus, the photocell 38 will be irradiated with a light pulse of a predetermined constant duration each time the direction of rotation of the input shaft 14 is reversed.

As shown in FIG. 4, the anode of the photocell 38 is connected to the base of a PNP transistor 52 and the cathode of the photocell 38 is connected to the collector of the transistor 52. The emitter of the transistor 52 is connected to the positive side of a 12 volt DC source applied to a terminal 54. The collector of the transistor 52 is connected through the actuating coil of a graphic or pen recorder 56 to the minus side of the 12 volt DC source applied to a terminal 58.

Each time the photocell 38 is irradiated it will conduct and as a result a high negative voltage will be applied to the base of the transistor 52. This will render the transistor 52 conductive and the 12 volts applied between terminals 54 and 58 will be applied across the recorder 56. Thus, each time a pulse of light is applied to the photocell 38, a 12 volt pulse will be applied to the actuating coil of the recorder 56. The length of the pulse will be determined by the length of the light pulse applied to the photocell 38, which as explained above, is a contant predetermined duration. Accordingly, the pulses applied to the recorder 56 as a result of the light pulses applied to the photocell 38 will be of constant impulse content. Thus, each time the direction of rotation of the shaft 14 is reversed a constant impulse content pulse will be applied to the recorder 56. The inertia of the movement of the recorder 56 together with the inductance of the actuating coil are such that the recorder will not respond to each applied pulse, but will record an indication proportional to the frequency of the pulses currently being applied to the recorder. The recorder 56 for example may be of the type manufactured by Esterline Angus Instrument Company under the name of Single-channel Curvilinear Recorder/A601C.

Thus the system of the present invention will indicate of the frequency of shaft reversals of the input shaft 14. To use the apparatus of the present invention in the system described in the above mentioned copending application Ser. No. 329,037 a driving linkage is provided between the drive wheel 16 and the steering wheel of the vehicle in which the test is being conducted. The recorder 56 will then record a continuous indication of the frequency of steering wheel reversals.

Thus the present invention provides a relatively simple system for providing a continuous indication and a recording of the frequency of reversals of rotation of an input shaft employing a unique mechanically actuated constant impulse content generator. The above description is of a preferred embodiment of the invention and many modifications may be made thereto without departing from the spirit and scope of the invention, which is defined in the appended claims.

The invention claimed is:

1. A measuring device for use in driver training apparatus comprising an input shaft, an actuator coupled to said shaft to be driven thereby, means to limit the motion of said actuator between predetermined limits, the coupling between said actuator and said shaft permitting said shaft to rotate relative to said actuator when said actuator has been driven by said shaft to one of said limits, first and second stops, a shutter movable between said first and second stops, means interconnecting said shutter and said actuator to drive said shutter from said first to said second stop when said actuator is driven in one direction between said limits and to drive said shutter from said second stop to said first stop when said actuator is driven in the opposite direction between said limits, means to produce each time said shutter moves between said stops and output pulse having a predetermined amplitude and having a width corresponding to the time said shutter is in a predetermined portion of its path between said first and second stops and indicating means connected to receive said pulses and operable to indicate the amplitude of an applied signal voltage, said indicating means having a slow response relative to the width of said pulses so that the indication provided by said indicating means is indicative of the frequency of the pulses currently being applied thereto.

2. A measuring device as recited in claim 1 wherein said means interconnecting said actuator and said shutter is a spring biasing a point on said actuator and a point on said shutter away from each other.

3. A measuring device as recited in claim 2 wherein said spring comprises a wire having one end mounted in said actuator and the other end mounted in said shutter, said wire being bowed between its ends.

4. A measuring device as recited in claim 1 wherein said means to produce pulses comprises photoelectric means mounted on one side of said shutter and the light source mounted on the other side of said shutter.

5. A measuring device as recited in claim 4 wherein said shutter comprises a movable arm having an aperture defined therein positioned to pass through the path between said light source and said photoelectric means when said shutter is moved between said first and second stops.

6. A measuring device as recited in claim 1 wherein said shutter is rotatably mounted on said shaft and moved between said first and second stops by rotating on said shaft.

7. A measuring device as recited in claim 1 wherein said actuator is rotatably mounted on said shaft with a friction fit so that said shaft will drive said actuator within a predetermined angle defined by said limits but will rotate with respect to said actuator when said actuator has reached one of said limits defining said predetermined angle.

References Cited
UNITED STATES PATENTS

| | | | |
|---|---|---|---|
| 564,168 | 7/1896 | Tower | 340—271 |
| 740,547 | 10/1903 | Fiske. | |
| 1,546,097 | 7/1925 | Mills et al. | |
| 1,736,064 | 11/1929 | Walker | 340—271 |
| 3,156,115 | 11/7964 | Adelman. | |

RUDOLPH V. ROLINEC, Primary Examiner

P. F. WILLE, Assistant Examiner

U.S. Cl. X.R.

324—70; 340—271